United States Patent [19]

Byrnes, Jr.

[11] 4,273,730

[45] Jun. 16, 1981

[54] TAMPER RESISTANT IDLE ADJUSTMENT SCREW

[75] Inventor: Thomas J. Byrnes, Jr., St. Charles, Mo.

[73] Assignee: ACF Industries, Incorporated, New York, N.Y.

[21] Appl. No.: 95,465

[22] Filed: Nov. 19, 1979

[51] Int. Cl.³ .............................................. F02M 3/08
[52] U.S. Cl. ................................... 261/41 D; 261/71; 261/DIG. 38; 137/382
[58] Field of Search .............. 261/DIG. 38, 71, 41 D; 137/382

[56] References Cited

U.S. PATENT DOCUMENTS

| 1,561,974 | 11/1925 | Del Giudice | 137/382 |
| 2,033,371 | 3/1936 | Benaggio | 261/DIG. 38 |
| 2,922,615 | 1/1960 | McInerney | 137/382 |
| 2,994,341 | 8/1961 | Leopold, Jr. et al. | 137/382 |
| 3,454,264 | 7/1969 | Sarto | 261/DIG. 38 |
| 4,120,918 | 10/1978 | Codling | 261/71 |

Primary Examiner—Tim R. Miles
Attorney, Agent, or Firm—J. Joseph Muller

[57] ABSTRACT

A carburetor improvement inhibits tampering with an idle adjustment screw after an initial adjustment of the screw is made. The screw is inserted in a cavity formed in the carburetor body and a plug is placed in the open outer end of the cavity. Further, a blocking pin is inserted transversely through the cavity between the plug and the adjustment screw.

3 Claims, 2 Drawing Figures

TAMPER RESISTANT IDLE ADJUSTMENT SCREW

BACKGROUND OF THE INVENTION

This invention relates to tamperproofing of a carburetor and, more particularly, to making the idle adjustment mechanism of the carburetor tamper resistant.

As a step toward reducing pollution caused by automobile engines, various portions of a carburetor are now required to be tamperproofed. This is done to prevent adjustments in carburetor operation after the carburetor has been adjusted to baseline specifications during manufacture. Since these baseline specifications are established, inter alia, with keeping engine exhaust emissions to a minimum, it is expected that by preventing later adjustments to the carburetor engine exhausts will be kept to a minimum.

SUMMARY OF THE INVENTION

Among the several objects of the present invention may be noted the provision of tamper resistant means for inhibiting adjustment of a carburetor's idle setting; the provision of such tamper resistant means by which later adjustment of carburetor idle, after an initial adjustment is made, is prevented; and the provision of such tamper resistant means which is quickly and easily installed on the carburetor during its manufacture.

Basically, the improvement of the present invention comprises means for making the fuel adjusting means for a carburetor idle fuel circuit tamper resistant to prevent further adjustment of the fuel adjusting means after an initial adjustment has been made. The initial adjustment of the fuel adjusting means provides an air-fuel mixture conducive to low engine emissions during engine idle speed operation. The tamper resistant means prevents adjusting of the fuel adjusting means to produce an air-fuel mixture for which relatively higher engine emissions are produced than are produced with the adjusting means set at its initial adjustment. Other objects and features will be in part apparent and in part pointed out hereinafter.

BRIEF DESCRIPTION OF THE DRAWINGS

Corresponding reference characters indicate corresponding parts throughout the two views of the drawings.

DESCRIPTION OF A PREFERRED EMBODIMENT

Figure 1:
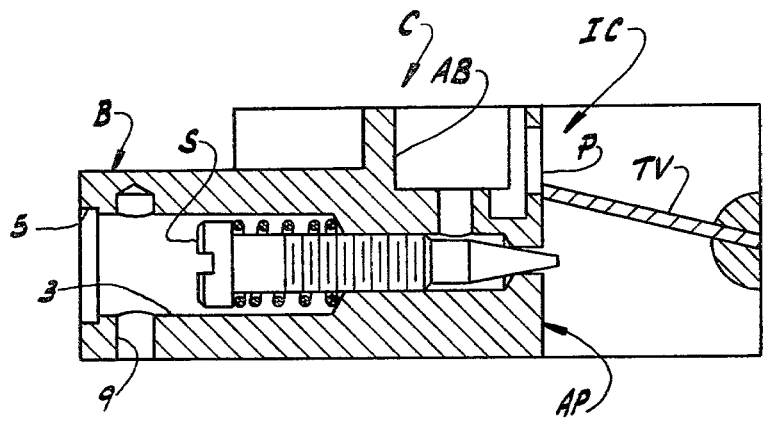
FIG. 1 is a sectional view of a portion of a carburetor illustrating a portion of the carburetor's idle speed fuel circuit and means for adjusting the air-fuel ratio of the idle speed mixture.
Figure 2:
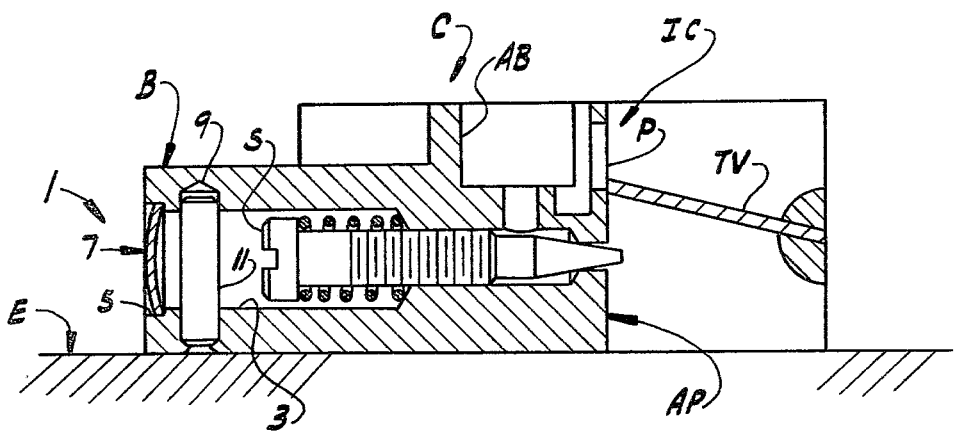
FIG. 2 is a sectional view of the carburetor of FIG. 1 illustrating the improvement of the present invention for tamperproofing the idle speed mixture adjusting means.

Referring to the drawings, a carburetor C for an internal combustion engine E has an idle speed fuel circuit IC, a portion of which is shown in FIGS. 1 and 2. Operation of idle speed fuel circuits are well known in the art. Such circuits are designed to supply fuel to an air passage AP of carburetor C when a throttle valve TV of the carburetor is substantially closed as shown in the drawing figures. Fuel flowing in the idle speed circuit enters air passage AP through a port P in the side wall of the passage. The air-fuel mixture produced in passage AP is ultimately combusted in engine E.

The carburetor has means such as a spring-loaded idle adjustment screw S for adjusting the quantity of fuel mixed with air to make the resultant mixture richer or leaner. Screw S is a slot-headed screw which, when turned in one direction or the other, admits more or less air, drawn into carburetor C through an auxiliary air passage AB, into air passage AP thereby altering the vacuum pressure in the air passage below throttle valve TV. Typically, carburetor C is mounted on a flow stand during part of its manufacturing process and screw S is adjusted until the idle speed mixture produced has a specified air-fuel ratio. This baseline value reflects certain engine operating parameters at idle speed. Important among these parameters is minimal engine exhaust emissions.

In the past, screw S, because of its accessibility, has been readily adjustable by an operator of a vehicle in which carburetor C is installed. Because of this, the idle speed mixture can be changed so the engine exhaust emissions are relatively higher than those engine E would produce if the initial adjustment of screw S was maintained.

The improvement of the present invention comprises tamper resistant means 1 (see FIG. 2) for inhibiting further adjustment of idle speed adjustment screw S after initial adjustment of the screw is made. Means 1 is designed to prevent further access to screw S after initial adjustment of the screw during carburetor C flow testing. As shown, carburetor C has a body B in which an inwardly extending cavity 3 is formed. Cavity 3 is sized to accomodate idle adjustment screw S and the depth of the cavity is such that the outermost end of the screw is well inside the cavity. The outer end 5 of cavity 3 is of somewhat larger diameter than the remainder of the cavity and a plug 7 is pressed into this open end of the cavity to seal it. Plug 7 is, for example, a Welsh plug and is in a compressive state when fitted into end 5 of cavity 3.

Although plug 7 renders screw S inaccessible, it is possible for someone to gain access to the screw by prying out, drilling through, or otherwise violating the seal formed by the plug. To maintain screw S inaccessible, even if the seal is violated, upwardly extending bore 9 is made in carburetor body B. Bore 9 extends into and through cavity 3 and is transverse to the longitudinal axis of the cavity. Bore 9 extends upwardly from the bottom surface of body B and terminates somewhat short of the upper surface of the body.

A blocking pin 11 is inserted into bore 9 prior to installation of carburetor C on engine E. The length of pin 11 is such that it extends completely across cavity 3 and the diameter of the pin is such that it substantially blocks the cavity. Bore 9 is so located that pin 11 is between plug 7 and idle adjustment screw S. Thus, even if plug 7 is removed or otherwise violated, a screwdriver or other tool cannot be brought to bear on screw S to change idle adjustment. Since the bottom surface of carburetor body B rests on the upper surface of engine E when carburetor C is installed on the engine, the only way pin 11 can be removed from its blocking position is by removing the carburetor from the engine E, thus to expose the outer end of the bore. However, to further frustrate adjustment changes, blocking pin 11 is staked in place. As a consequence, screw S cannot be tampered with and the initial idle speed adjustment is maintained after carburetor C is in public use.

In view of the above, it will be seen that the several objects of the invention are achieved and other advantageous results obtained.

As various changes could be made in the above constructions without departing from the scope of the invention, it is intended that all matter contained in the above description and shown in the accompanying drawings shall be interpreted as illustrative and not in a limiting sense.

What is claimed is:

1. In a carburetor for an internal combustion engine, the carburetor having a body through which an air passage extends and an idle speed fuel circuit for supplying fuel to the passage to mix with air and form an air-fuel mixture combusted in the engine, and an idle adjustment screw for adjusting the quantity of fuel mixed with air to make the resultant mixture richer or leaner, the idle adjustment screw being settable during flow testing of the carburetor to an initial adjustment position, the improvement comprising means for making the idle adjustment screw tamper resistant to inhibit further adjustment of the screw after the carburetor is installed on the engine, the carburetor body having a cavity formed for the screw and a bore transverse to the longitudinal axis of the cavity, the tamper resistant means including a plug for sealing the open end of the cavity and a blocking pin inserted into the bore, the location of the bore being such that the blocking pin is between the idle adjustment screw and the plug, the length and diameter of the pin being such as to substantially block the cavity so an adjustment tool cannot be brought to bear on the idle adjustment screw even if the seal formed by the plug is violated and the length of the blocking pin further being such that the blocking pin is captured in the bore by staking or the like and cannot be removed therefrom whereby the tamper resisting means inhibits adjustment of the idle adjustment screw to produce an air-fuel mixture for which relatively higher engine emissions are produced than are produced with the idle adjustment screw set to its initial adjustment.

2. The improvement as set forth in claim 1 wherein the bore extends upwardly from the bottom surface of the carburetor body, the bottom surface of the body resting on the top surface of the engine when the carburetor is mounted thereon whereby the blocking pin cannot be removed from the bore when the carburetor is mounted on the engine.

3. The improvement as set forth in claim 1 wherein the plug is a Welsh plug.

* * * * *